United States Patent [19]

Nelson et al.

[11] Patent Number: 5,120,620
[45] Date of Patent: Jun. 9, 1992

[54] BINARY LEAD-TIN ALLOY SUBSTRATE FOR LEAD-ACID ELECTROCHEMICAL CELLS

[75] Inventors: Robert F. Nelson; David M. Wisdom, both of Warrensburg, Mo.

[73] Assignee: Gates Energy Products, Inc., Gainesville, Fla.

[21] Appl. No.: 573,106

[22] Filed: Aug. 24, 1990

[51] Int. Cl.⁵ .............................................. H01M 4/68
[52] U.S. Cl. ................................... 429/225; 429/245
[58] Field of Search ...................... 429/245, 225, 204; 420/570

[56] References Cited

U.S. PATENT DOCUMENTS

| | | | |
|---|---|---|---|
| 4,092,462 | 5/1978 | Giess et al. | 429/245 X |
| 4,125,690 | 11/1978 | Bagshaw et al. | 429/226 |
| 4,137,378 | 1/1979 | Nees et al. | 429/245 |

Primary Examiner—Anthony Skapars
Attorney, Agent, or Firm—C. H. Castleman, Jr.; S. G. Austin; J. L. Isaac

[57] ABSTRACT

A binary lead-tin alloy substrate for support of the electrochemically active material in lead-acid cells is disclosed having a tin concentration from about 0.3 to about 0.9 weight percent, the balance being lead. The tin impedes the formation of a passivation layer at the interface between the grid material and the active material improving cell recovery from deep discharge and improving cold cranking amperes performance.

14 Claims, 2 Drawing Sheets

BINARY LEAD-TIN ALLOY SUBSTRATE FOR LEAD-ACID ELECTROCHEMICAL CELLS

BACKGROUND OF THE INVENTION

This invention relates to the use of a binary lead-tin alloy substrate as the current collector and mechanical support for the electrochemically active material in pasted electrodes (Faure type) for lead-acid cells particularly of the normally sealed type.

Traditionally, the grid substrate material in lead-acid cells has been either pure lead (minimum 99.9 percent by weight) or a lead alloy containing metals such as calcium and antimony. Pure lead, which provides extended float life through reduced corrosion, is oftentimes too soft to be used or processed as a grid material except for special applications such as in Plante plates and some spirally wound batteries. To stiffen the grid material, calcium and antimony are commonly alloyed with lead. Tin has also been added to alloys of lead. Tin, when added to alloys of lead-calcium operates synergistically with the calcium to improve metal fluidity and castability. Tin in the amount of 0.5 to 1.0 weight percent added to alloys of lead-calcium also enhances the mechanical and corrosion resistant properties of the alloy. Minimal amounts of tin are used because of the expense and relative scarcity of the element.

Passivation in the positive plate of lead-acid cells is a problem that has been known for some time. Passivation has been attributed to the formation of lead oxide (tetragonal PbO) at the grid/active material interface in the positive plate. Lead oxide acts effectively as an insulator on the grid leading to passivation. The result is increased impedance within the lead-acid cell which is manifest as poor recovery from deep discharge. This refers to the lead-acid cell's inability to recover capacity when the cell is allowed to stand after complete discharge and is subsequently charged.

In dry charge plates either prepared in a Plante L or Faure type process, tin reduces the formation of the passivation layer on the grid material while in storage. The effect is that dry charge plates containing tin maintain high activation rates even after a long, dry run storage. In Plante-type plates, use of a binary lead-tin alloy containing less than 1 weight percent tin is known. In Faure-type dry charged plates, the "tin effect" is not exhibited until the concentration of tin is greater than 0.5 weight percent and when alloyed with other metals such as calcium.

In normally sealed lead-acid cells, tin has been incorporated in the grid material to prevent passivation of the positive electrode. The addition of tin has been accomplished by simple alloying and by deposition of a tin-rich layer on the surface of the grid by such methods as lamination. To facilitate recovery from deep discharge, Kobayashi et.al. U.S. Pat. No. 4,761,356 teaches that the content of tin should exceed three weight percent.

Lead-tin alloys have also been used as material for both intra- and intercell connectors and the positive posts of a lead-acid batteries. In a connector, it has been disclosed that the tin content should be less than ten weight percent to maintain the formability of the connector. A tin content between 0.1 and 1.5 weight percent has been used in the positive posts. Such posts are disclosed to have the advantage of good adherence, promoting long lifetime of the post seals attached to the post.

It is a primary objective of this invention to provide a substrate material to be used as the current collector and mechanical support for the active material in lead-acid cells which leads to enhanced performance by improving the ability of the cell to recover from deep discharge and to increase the cold cranking ampere capacity.

It is another object of this invention to provide an electrode for a lead-acid cell which is not subject to passivation while minimizing cost by reducing the amount of tin used in the electrode well below the three weight percent minimum level taught by the prior art before the effects of tin are realized.

It is a further object of this invention to provide a substrate material in which the tin is available throughout the lead sheet and in particular throughout the grain body of the alloy to ensure that there are active controlled corrosion sites continually available to inhibit the formation of the passivation later at the boundary between the substrate material and the active material.

SUMMARY OF THE INVENTION

Briefly described, in one aspect of the invention the substrate material which serves as the current collector and mechanical support for the electrochemically active material for an electrode of a lead-acid cell consists essentially of a binary lead-tin alloy of between about 0.3 and about 0.9 weight percent tin, the balance being lead. The tin in the alloy is available throughout the entire grain. The distribution of the tin and grain size are obtained by controlling the parameters of manufacture of the material. The substrate material can be manufactured in any manner, such that the tin is not concentrated at the boundary of the grain. Methods of manufacture include chill casting and cold working of suitable substrate material. If the material is manufactured by a continuous chill cast process, the grain size and character of the grain can be controlled by varying such aspects as the temperature of the casting drum, rotation speed of the casting drum, of the air temperature impinging on the casting drum. The physical characteristics of substrate material manufactured by cold working can be controlled by varying the thickness of material, the number of passes through the presses and the roller pressure used in the manufacture.

Another aspect of the invention is directed to an electrode made from the aforementioned substrate material. In such electrode, the active material is mechanically bonded to the substrate material.

In still another aspect, the invention pertains to a normally sealed lead-acid electrochemical cell of the oxygen recombination type exhibiting up to 20 percent increase in cold cranking capacity compared to cells employing prior art substrates. The cell includes a cell housing in which is disposed porous positive and porous negative electrodes sandwiching a porous compressible separator under firm mutual stacking pressure, a liquid acid electrolyte in limited amount tightly absorbed within the plates and separator, and at least the positive plate being made of the aforementioned binary lead-tin alloy.

BRIEF DESCRIPTION OF THE DRAWINGS

The invention will be more particularly described in certain of its preferred embodiments in conjunction with the accompanying drawings, in which like numerals designate like parts and in which.

PREFERRED EMBODIMENTS F THE INVENTION

Figure 1:
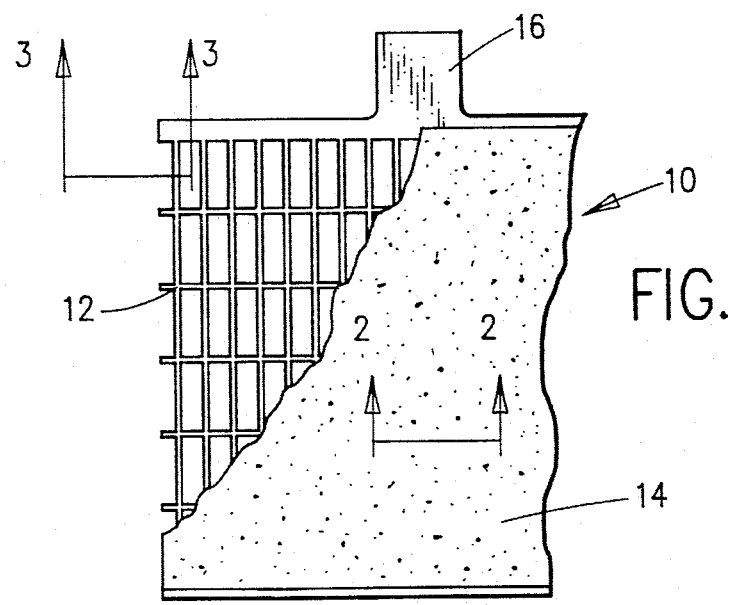
FIG. 1 is a broken away front view of an electrode encompassing the invention.
Figure 2:
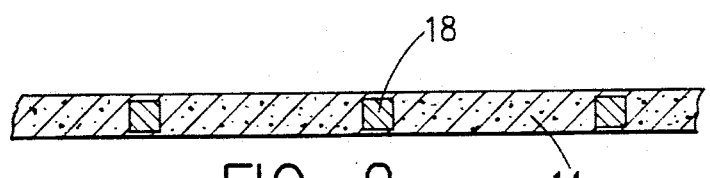
FIG. 2 is a sectional view along 2—2 of FIG. 1.

The embodiment in FIGS. 1 and 2 is that of an electrode 10 made in accordance with the invention. The electrode is formed of a grid substrate 12 in which is supported electrochemically active material 14 such as lead or compounds of lead which, upon electroforming, produce either a positive plate containing lead dioxide as the electrochemically active material, or a negative plate having a lead in sponge form as the active material. The plates are formed by pasting grids 12 made of lead-tin binary alloy in accordance with the invention, with such active materials. The grids may be formed, for instance, into perforated sheets, expanded mesh, or directly cast. The grid may also be formed from a composite of plastic with lead for weight reduction. Preferably the grids are provided with integral or nonintegral collector tab extensions 16 which are adapted to be joined to like tabs of common polarity plates of a cell such as by welding.

In accordance with the invention, the binary lead-tin alloy used for the grid 12 containing from about 0.3 to about 0.9 weight percent tin, preferably from about 0.5 to about 0.8 weight percent tin, and most preferably from about 0.6 to about 0.75 weight percent tin, the balance being lead. No other metals such as calcium (which significantly accelerates corrosion) or antimony should be present in the binary alloy other than in very small amounts, i.e. not aggregating more thin about 0.01 weight percent of the alloy.

As shown in FIG. 2, the electrode is formed of shanks or wire portions 18 supporting the active material 14 and preferably forming an outermost layer thereover. The active material may be applied to the grid in any manner, such as by the process taught in Chang et.al. U.S. Pat. No. 4,050,482.

Figure 3:
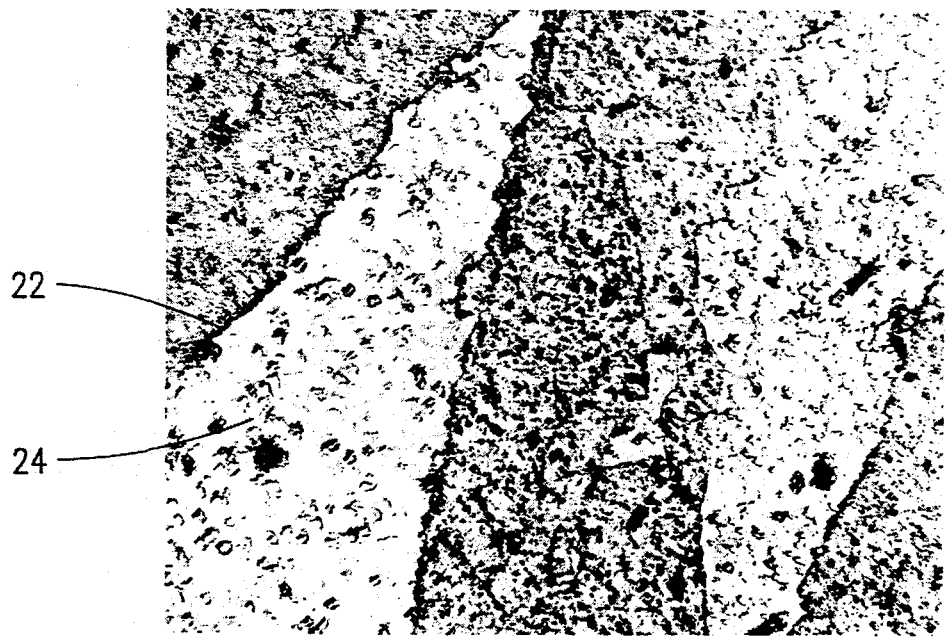
FIG. 3 is a photomicrograph sectional view along 3—3 of FIG. 1 of a chill cast sheet of the binary lead-tin alloy of the invention where the concentration of tin is 0.7 weight percent, the balance being lead. Magnification is 400×.

Grain size and tin distribution is general have been found to have a significant effect on well performance. Grain size generally varies preferably from about 0.5 to about 3.5 ASTM Micro Grain size (ASTM E112-85, Standard Methods for Determining the Average Grain Size). Referring to FIG. 3, there is shown generally the grain structure of a preferred form of the binary lead-tin alloy for use in float applications. The grains are of approximately ASTM Micro-Grain size no. 3. The preferred grain size in general is from about 2.5 to about 3.5. There is generally an abundance of tin homogeneously spread throughout the grain body. In contrast to known lead-tin binary alloys used in lead-acid cells, there is not significantly more tin at the grain boundary 22 than at the center 24 of the grain. Having tin available throughout the grain body, particularly in the positive plate, ensures slow, controlled corrosion and maintenance of passivation-inhibiting material even after corrosion has progressed inwardly from the boundary 22. This type of grain of the invention of general homogeneous character may be formed by a method in which the molten precursor material is rapidly quenched substantially preventing the tin from diffusing preferentially to the groin boundary. One method of accomplishing the formation of such grains is by chill casting the material. The chill cast material is made by rotating an internally chilled casting drum in a molten bath of the binary lead-tin procedure for alloy. By controlling such factors as the temperature of the rotating drum, the air impinging on the drum, and the speed of the drum, the quench can be controlled. The preferred temperature of the internally chilled casting drum is from about 60° F. (15° C.) to about 110° F. (43° C.). The preferred temperature of the bath of molten binary alloy is from about 620° F. (327° C.) to about 640° F. 338° C.). At these drum and bath temperatures it is preferred the chill caster expel the chill cast substrate material at about 60 to about 80 feet per minute.

Another method for obtaining a generally homogeneous distribution of tin throughout the alloy, and favoring cycle application of the cells, is by cold working an ingot of the binary lead-tin alloy. The cold worked material will have, compared to chill cast material, smaller grains typically from about 0.5 to about 1.0 ASTM Micro-Grain size. However, as with the chill cast material the tin will be available substantially throughout the grain body to provide corrosion sites. These corrosion sites are believed to distrust the formation of the passivation layer and thereby prevent impedance buildup in the cell which is particularly useful in cycle applications in which the cell may be deep discharged.

Figure 4:
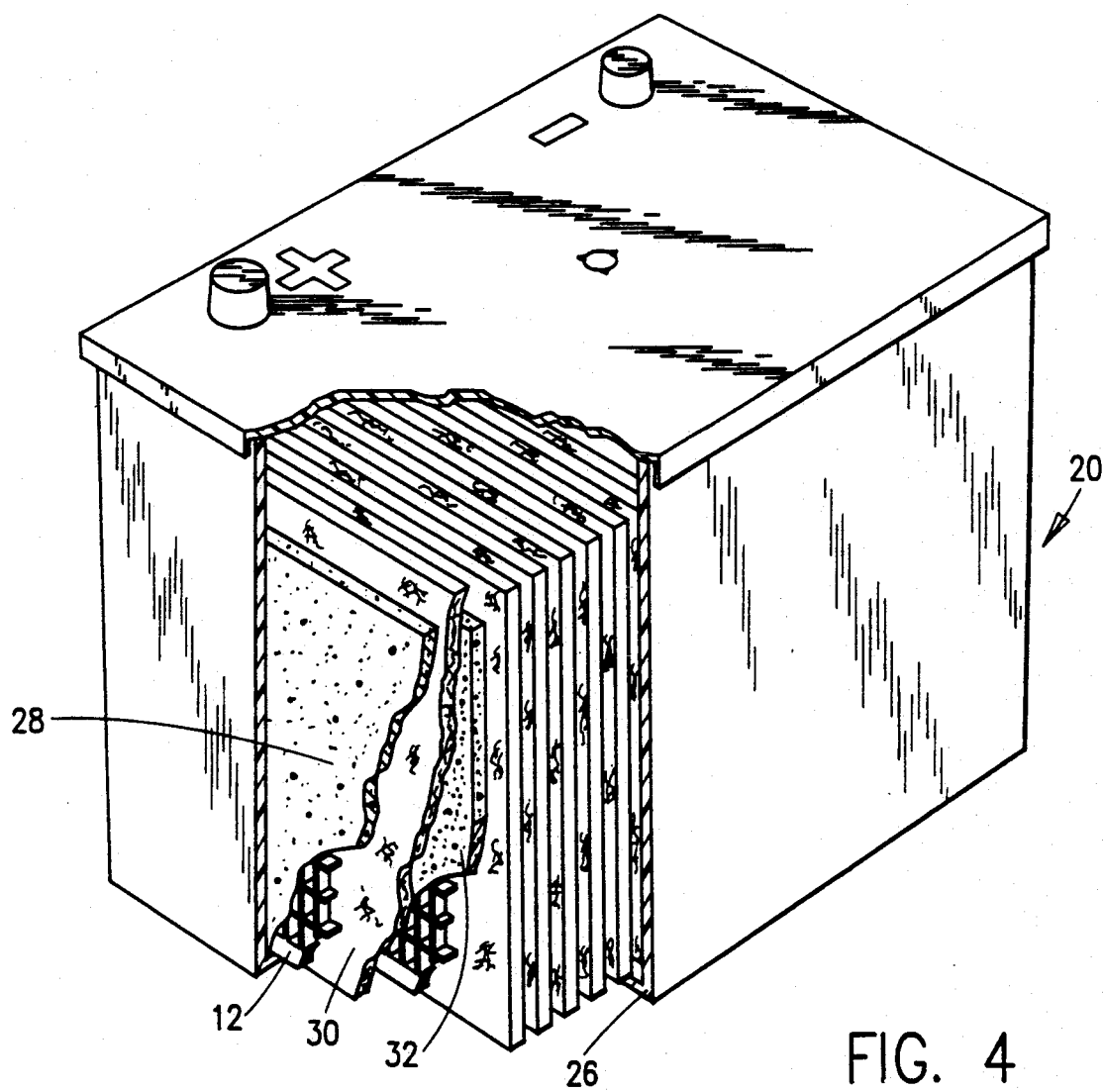
FIG. 4 depicts in partial sectional cutaway, a perspective view of an alternative multiple cell configuration in accordance with the invention.

A normally sealed multicell lead-acid battery 20 employing the electrode(s) of the invention is shown in FIG. 4. A plurality of electrochemical cells are housed in monobloc container 26 in prismatic configuration. Other configurations such as spiral are also contemplated. In each cell are disposed at least one positive porous plate 32 and negative porous plate 28 sandwiching porous compressible separator 30 under firm mutual stacking pressure. An acid electrode in liquid form and of limited amount is tightly absorbed in the plates and separator. For gas recombinant operation the total pore volume of the plates and separator contain voids ("starved" condition) to assure rapid oxygen diffusion to the negative plate where the oxygen is consumed at thin electrolyte sites.

The plates should have current collector tab extensions 16 (not shown in FIG. 4) which are joined such as by welding or the cast-on-strap process with intercell connectors to form unitary intra- and intercell connections.

As disclosed in this invention, a advantage of putting tin into the positive grid is to facilitate recovery from deep discharge. As very little in the way of electrical performance data for the binary lead-tin alloy is available, a comprehensive qualification test program was undertaken using a multicell recombinant lead-acid automotive sealed lead-acid battery of the type taught in Puester, U.S. Pat. No. 4,780,37 in which both the positive and negative electrodes contained the binary lead-tin alloy substrate of the invention. The performance of a 12 volt test battery, made in accordance with the invention, was compared to a 12 volt commercially available battery (control) containing a pure lead positive grid, otherwise of the identical construction as the test battery.

The test and control batteries wee compared using standard Society of Automotive Engineers (SAE) automotive battery performance tests. The tests included: reserve capacity tests, cold crank tests, ad the J240 life test.

The reserve capacity test examine battery performance relevant to key off loads or operation with the failed alternator. The batteries are fully charged and stabilized at a temperature of 80° F.±1° F. (26.7° C.±5.6° C.). They are then discharged at 25±0.25 amperes, to a terminal voltage of 10.5 volts.

The cold cranking test simulates engine starting under adverse conditions. The batteries are fully charged and stabilized at a temperature of 0° F.±2° (−17.8° C.±1.1° C.) for a minimum of 18 hours. They are then discharged at the rated load. The minimum nd of discharge voltage must not fall below 7.2 volts when measured under the rated load after 30 seconds of discharge.

The J240 life test represents one method of assessing battery life under load. A fully charged battery is tested in a water bath maintained at 105° F.±5° F. (40.6° C.±2.8° C.). One test cycle consists of discharge for 4 minutes±10 seconds at 25±0.1 amps, then charge for 10 minutes±3 seconds at a voltage of 14.8 volts and a maximum charge rate of 25±0.1 amps. The battery is continually cycled for 100 hours. The battery fails when it no longer can maintain 7.2 volts for a minimum of 30 seconds at the cold cranking rate for two consecutive 100 hour test periods.

The DIN (German Standards Organization) cold crank test is similar to the SAE crank test except the test period is for 150 seconds rather than 0 seconds. The batteries are fully charged then stabilized at 0° F.±2° F. (−17.8° C.±1.1° C.) long enough for the center cells to reach 0° F. (−17.8° C.). The batteries are discharged at an appropriate test rate. The load voltage cannot fall below six volts for 150 seconds if the battery is to meet the test rating.

Table 1 contains the results of the Battery Council International (BCI) test regime. Battery A is the aforementioned control battery of the prior art in which the positive grid is 99.99 weight percent lad. Battery B is the aforementioned battery of the invention in which the positive grid is 0.65 weight percent tin, the balance being lead. Battery C is of the invention s identical to battery B except the specific gravity of the electrolyte has been reduced from 1.342 as in batteries A and B to 1.286, and electrode material balances (sulfate content of positive plate paste) somewhat optimized. The positive grid of battery B and battery C was made from the chill cast substrate material. The substrate was cast at a rate of 70 feet per minute using an internally cooled casting drum which had an inlet coolant temperature of 90° F. (32.5° C.). The temperature of the molten binary lead-tin alloy was 630° F. (333° C.). EDAX analysis verified that the tin was distributed generally uniformly and homogeneously throughout the grain microstructure of allow grid substrate of the same type used in the positive and negative electrodes of battery B (and battery C). In this test regime, the reserve capacity of the battery is first tested. The battery is then recharged and subjected to the cold crank test. The above regime is ten repeated. After the second cycle of reserve capacity nd cold crank tests, the battery's reserve capacity is tested once more.

As shown in Table 1 there is a substantial improvement in reserve capacity for batteries B and C containing the binary alloy substrate of the invention. After the third reserve capacity test, control battery A had a reserve capacity of 108 minutes, while battery B delivered 118 minutes and battery C had a reserve capacity of 126 minutes. Differences in the first cold cranking performances were dramatic. The second col cranking amperage capacity increased from 675 for battery A to 725 for battery B and to 850 for battery C. Analysis of the data for the J240 life test indicates that control battery A failed after an average of 6,000 cycles while batteries and C of the invention failed after an average of 11,000 cycles. Additionally, batteries B and C outperformed battery A in DIN cold cranking amperage capacity. Battery A had a cold crank of 275 amps while battery B was 300 and battery C was greater than 350. These tests demonstrate the significant improvement in battery performance with the addition of tin to the positive and negative grids.

TABLE 1

| | Battery Council International Test Results | | |
|---|---|---|---|
| Test | Battery A Prior Art Pure Lead | Battery B Invention Lead-Tin | Battery C Invention Lead-Tin |
| First Reserve Capacity (Minutes) | 115 | 115 | 120 |
| First Cold Crank (CCA) | 600 | 750 | 850 |
| Second Reserve Capacity (Minutes) | 119 | 122 | 133 |
| Second Cold Crank (CCA) | 675 | 725 | 850 |
| Third Reserve Capacity (Minutes) | 108 | 118 | 126 |
| J240 Life Test (Cycles) | 5,000–7,000 | 10,000–12,000 | 10,000–12,000 |
| DIN Cold Crank (CCA) | 275 | 300 | >350 |

Those skilled in the art will appreciate that the invention is capable of a variety of modifications which, along with equivalents, are embraced by the following claims.

What is claimed is:

1. A substrate which services as the current collector and mechanical support for the electrochemically active material of an electrode of the pasted typed, comprising:
   a binary lead-tin alloy consisting essentially of from about 0.3 to about 0.9 weight percent tin, any other metals present in the alloy aggregating no more than about 0.01 weight percent of the alloy, the balance being essentially lead; the alloy of the substrate having a grain structure defined by a central grain body and boundary surrounding the central grain body and boundary surrounding the central grain body such that the tin is contained generally homogeneously and free from being concentrated at the boundary.

2. The substrate material of claim 1, in which the tin content of the lead-tin binary alloy is from about 0.5 to about 0.7 weight percent.

3. The substrate material of claim 1, in which the size of the grain is between about ASTM Micro-Grain size no. 2.5 and 3.5.

4. The substrate material of claim 1, in which the size of the grain is between about ASTM Micro-Grain size no. 0.5 and 1.0.

5. The substrate material of claim 1 formed by rotating a casting drum in a bath of the molten alloy wherein the grain size is obtained by controlling the rotation speed of the casting drum, the temperature of the casting drum, or the temperature of the air impinging the casting drum.

6. The substrate material of claim 1 wherein the grain structure is obtained by cold working the material.

7. A pasted positive electrode for a lead-acid electrochemical cell employing the substrate material of claim 1 in which substrate material is homogeneous through the electrode.

8. The positive electrode in claim 7 in which the tin content of the lead-tin binary alloy is from about 0.5 to about 0.7 weight percent and in which the substrate material is homogeneous generally throughout the electrode.

9. A normally sealed lead acid electrochemical cell of the oxygen recombination type comprising:
a cell housing in which is disposed porous positive and porous negative pasted electrodes sandwiching a porous compressible separator under firm mutual stacking pressure, and an acid electrolyte in liquid from and limited amount tightly absorbed within the plates and separator plate and at last the positive electrode employing the substrate material of claim 1.

10. A normally sealed lead-acid electrochemical cell of the oxygen recombinant type comprising:
a porous pasted positive electrode;
a porous pasted negative electrode;
the positive electrode employing an electrically conductive substrate formed from a binary lead-tin alloy consisting essentially of from about 0.3 to about 0.9 weight percent tin, the balance being essentially lead, wherein the alloy of the substrate has a grain structure defined by a central grain body and boundary surrounding the central grain body such that the tin is contained generally homogeneously within the grain body, and free from being concentrated at the boundary;
porous compressible separator interposed between the positive and negative electrodes and existing under firm mutual stacking pressure with the electrodes;
an acid electrolyte in liquid form absorbed within the electrode plates and separator and present in an amount such that the total pore volume of the plates and separator is less than fully filled with the electrolyte; and
a cell housing in which is disposed the electrodes, separator and electrolyte.

11. The cell of claim 10 wherein the negative electrode employs a substrate of the same type employed by the positive electrode.

12. The electrochemical cell of claim 10 wherein the binary lead-tin alloy of the substrate contains no more than about 0.01 weight percent of any metal other than lead or tin in aggregate in the alloy.

13. The cell of claim 12 wherein the generally homogeneous distribution of tin in the central grain body is obtained by a method in which a molten precursor material of lead and tin is rapidly quenched, thereby preventing the tin from diffusing preferentially to the grain boundary.

14. The cell of claim 13 wherein the grid is formed by rotating an internally chilled casting drum in a molten bath of the binary lead-tin precursor alloy.

* * * * *

UNITED STATES PATENT AND TRADEMARK OFFICE
CERTIFICATE OF CORRECTION

PATENT NO.  : 5,120,620                                   Page 1 of 2

DATED       : June 9, 1992

INVENTOR(S) : Robert F. Nelson and David M. Wisdom

It is certified that error appears in the above-identified patent and that said Letters Patent is hereby corrected as shown below:

Column 3, line 49:  delete "Chang" and substitute therefor --Ching--.

Column 3, line 52:  delete "well" and substitute therefor --cell--.

Column 4, line 6:   delete "groin" and substitute therefor --grain--.

Col. 4, line 10, delete "procedure for" and substitute therefor --precursor--.

Column 5, line 3:   delete "wee" and substitute therefor --were--.

Column 5, line 6:   delete "ad" and substitute therefor --and--.

Column 5, line 18:  delete "nd" and substitute therefor --end--.

Column 5, line 35:  delete "0" and substitute therefor --30--.

Column 5, line 45:  delete "lad" and substitute therefor --lead--.

Column 5, line 48:  delete "s" and substitute therefor --is--.

Column 5, line 65:  delete "ten" and substitute therefor --then--.

Column 5, line 66:  delete "nd" and substitute therefor --and--.

Column 6, line 8:   delete "col" and substitute therefor --cold--.

UNITED STATES PATENT AND TRADEMARK OFFICE
CERTIFICATE OF CORRECTION

PATENT NO. : 5,120,620
DATED : June 9, 1992
INVENTOR(S) : Robert F. Nelson and David M. Wisdom It is certified that error appears in the above-indentified patent and that said Letters Patent is hereby corrected as shown below:

Column 6, line 13: after "batteries" insert therefor --B--.

Column 6, Claim 1, line 59: delete entire line "grain body and boundary surrounding the central".

Signed and Sealed this

Fourteenth Day of September, 1993

Attest:

BRUCE LEHMAN

*Attesting Officer*    *Commissioner of Patents and Trademarks*